May 2, 1961 R. M. FANO 2,982,852

ANTI-MULTIPATH COMMUNICATION SYSTEM

Filed Nov. 21, 1956 4 Sheets-Sheet 1

ROBERT M. FANO
*INVENTOR.*

BY Edward D. Thomas
AGENT

May 2, 1961 R. M. FANO 2,982,852

ANTI-MULTIPATH COMMUNICATION SYSTEM

Filed Nov. 21, 1956 4 Sheets-Sheet 2

ROBERT M. FANO
*INVENTOR.*

BY Edward D. Thomas
AGENT

ROBERT M. FANO
*INVENTOR.*
BY
Edward D. Thomas
AGENT

ROBERT M. FANO
*INVENTOR.*

BY Edward D. Thomas
AGENT

United States Patent Office 2,982,852

Patented May 2, 1961

2,982,852

ANTI-MULTIPATH COMMUNICATION SYSTEM

Robert M. Fano, Lexington, Mass., assignor, by mesne assignments, to Research Corporation, New York, N.Y., a corporation of New York Filed Nov. 21, 1956, Ser. No. 623,652

11 Claims. (Cl. 250—6)

The present invention relates primarily but not exclusively to radio communication. Its means purpose is the improvement of the communication of intelligence in the presence of random disturbances such as noise and those associated with multipath ionospheric propagation. More particularly it concerns a method of encoding the message to be transmitted into a sequence of distinctive signals selected from an appropriate set and of a corresponding method of recognizing at the receiver the individual signals of the sequence and thereby decoding the message.

Multipath is a characteristic of many communication systems, short wave radio and underwater sound being specific examples, in which a receiver is fed a succession of signals of various strengths arriving at various times over various paths. In general the strengths and delays of the various signals vary slowly in a random manner. Multipath effects are found to produce two types of difficulties associated with the different times of arrival of a signal propagated over paths of different lengths. In the first place, the time lapse between the first and the last of a succession of signals sets a lower limit on the duration of a single signal element; to send such elements any faster results in the simultaneous arrival over separate paths of contiguous elements, which are usually impossible to separate. In the second place, signals arriving over paths of different lengths are effectively displaced in phase and consequently interfere with one another resulting in some cases in complete cancellation. Generally such multipath fading is frequency selective over a fairly narrow band of frequencies. By spreading the transmitted energy over a wide band of frequencies, fading around any one frequency will not cause as great a loss of received signal strength as will narrow-band transmission.

At present, most techniques for communicating through multipath can be described as "diversity" schemes to combat fading of narrow-band signals. Diversity schemes allow multipath induced fading of a received signal to exist, but by using several received signals, by means of receivers having different characteristics such as physical spacing, different frequency response or different polarization, whose outputs are combined in some fashion, the combined signal fades only when all receiver outputs fade simultaneously.

The present invention contemplates the use of a set of linear filters at the transmitter, each of which represents a code symbol. The filters are successively excited according to the message to be transmitted to produce their respective wide band impulse responses. The succession of wide band waveforms so generated comprises the transmitted message. At the receiver, the incoming signals are applied simultaneously to a second set of filters which correspond to the set of filters at the transmitter. A given waveform arriving over each particular propagation path will produce a sharply peaked signal at the output of the filter which is "matched" to the filter at the transmitter which generated it, and by proper selection of filters no other filter at the receiver will have a sharply peaked response. By observing the order in which the filters at the receiver produce peaked responses in each keying interval the order in which the corresponding filters at the transmitter were excited can be determined and the message can be decoded.

Accordingly, the principal object of this invention is to provide an improved wide band communication system for operation when the signal is propagated over multiple paths in travelling between transmitter and receiver and in the presence of noise.

This and other objects of the invention will be better understood from the following description when taken in connection with the accompanying drawing wherein:

Figure 1 is a diagram in schematic block form illustrating a particular embodiment of the invention.

Figure 2 including Figures 2*a* to 2*e* represent the envelopes of waveforms useful in understanding the operation of the embodiment illustrated in Figure 1.

Figure 1:
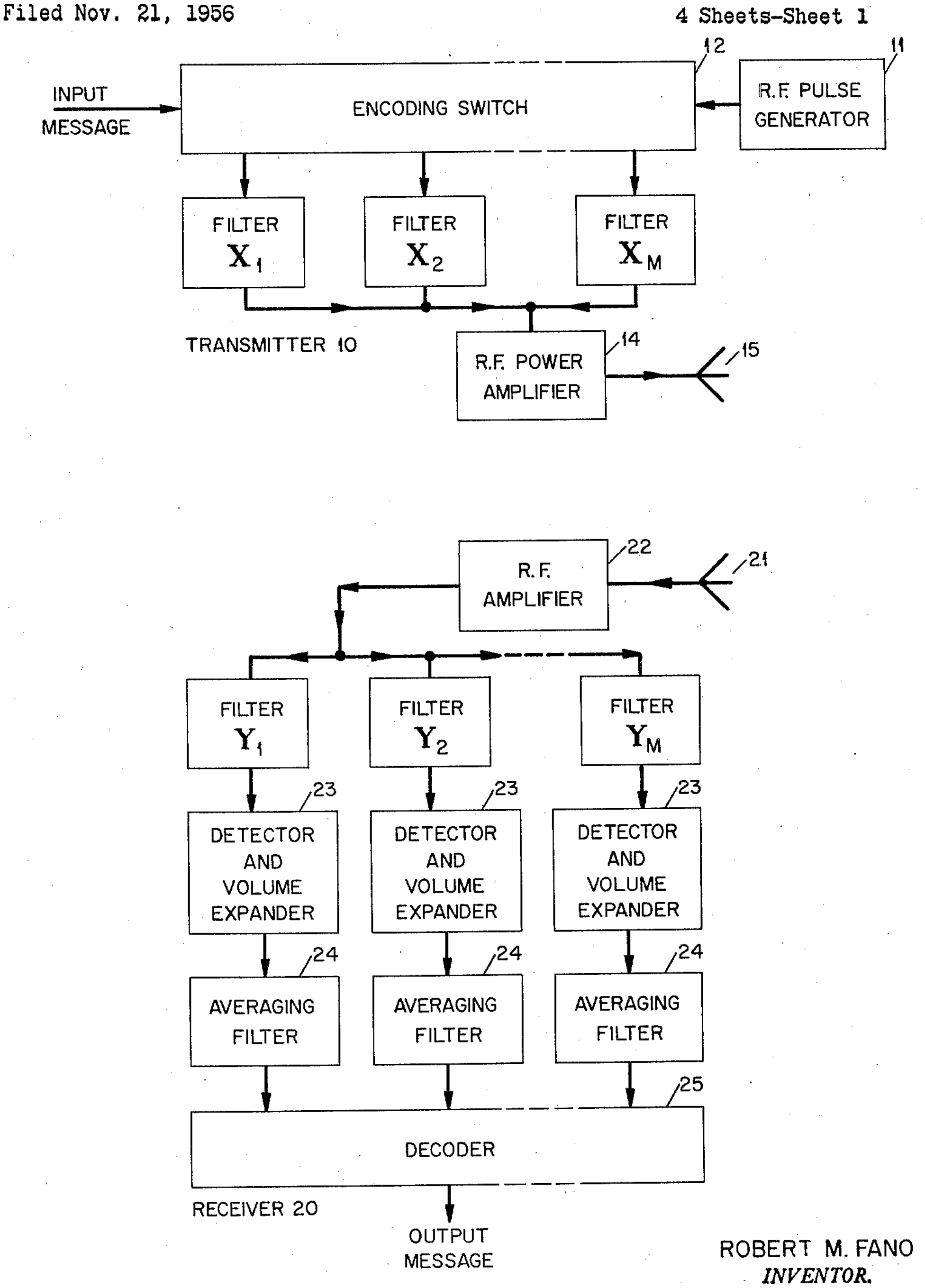
Figure 2:
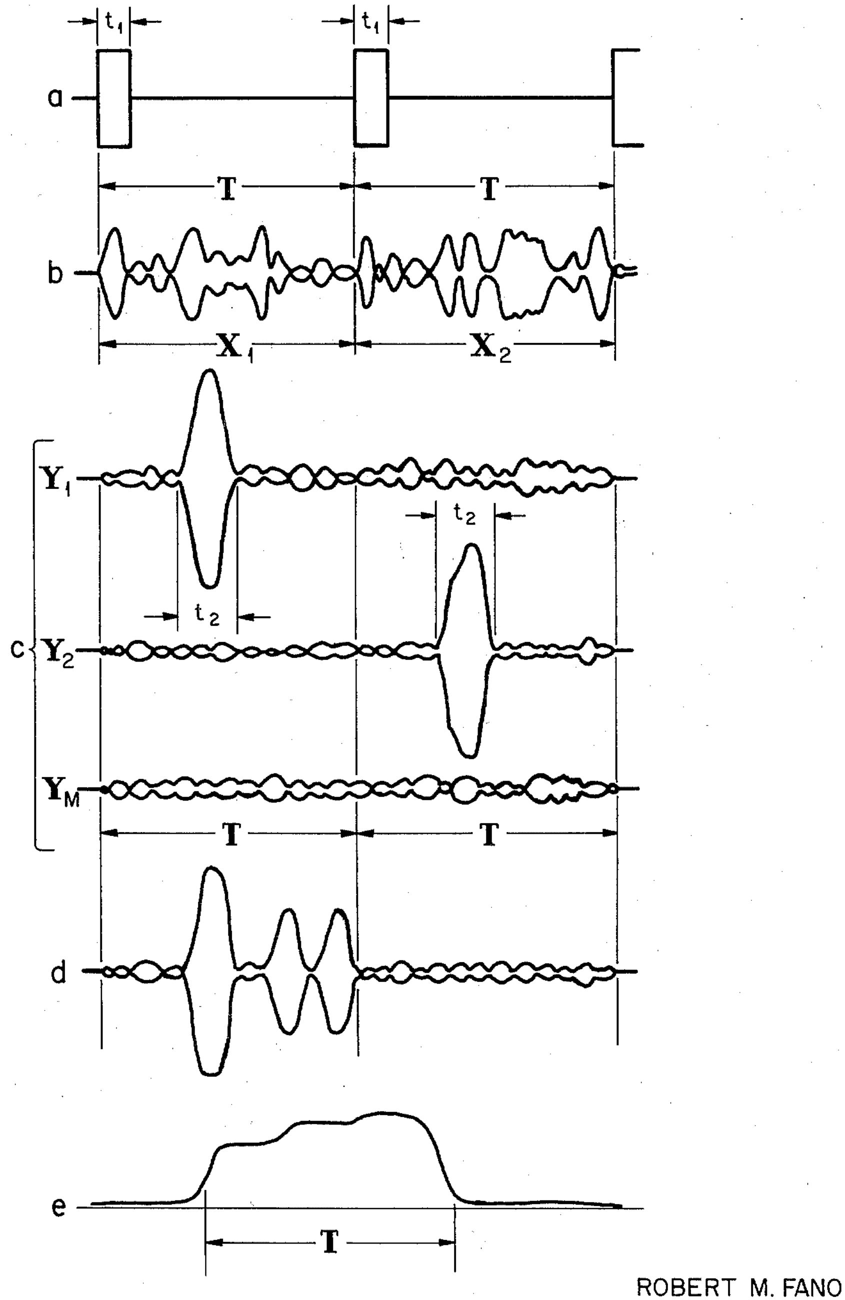

With reference to Figure 1, at the transmitter generally indicated at 10, filters $X_1, X_2 \ldots X_M$ are different linear filters with impulse response lasting for a time equal to T larger than the maximum multipath delay expected and occupying a frequency band approximately equal to W, greater than the reciprocal of the minimum expected time delay between signals arriving over adjacent paths. The pulse generator 11 feeds to encoding switch 12 a periodic sequence of radio frequency pulses, as illustrated by the time function (*a*) of the pulse envelope in Figure 2. Circuits for feeding an input signal to one of several output lines selected by means of a message code are well known and may be found, for example, in chapter 13 of "Design of Switching Circuits," by Reister, Ritchie and Washburn, published by Van Nostrand Co., Inc. in 1951. The frequency of the output pulses of pulse generator 11 is approximately equal to the center of the frequency band occupied by the impulse response of filters $X_1, X_2 \ldots X_M$; their width or time duration $t_1$, is appreciably smaller than $1/W$ and the time interval between pulses is T. Each of these pulses is fed by encoding switch 12 to one and only one of the filters $X_1, X_2 \ldots X_M$, according to the message to be transmitted. It is assumed that the input message has been supplied in the form of a sequence of symbols, such as mark and space, digits, or letters of the English alphabet, and that the number of different symbols is just equal to the number M of different filters. Thus each symbol of the input message to encoder 12 is transmitted as the response of a particular selected filter to the exciting pulse from pulse generator 11, as illustrated by the time function (*b*) of the waveform envelope of Figure 2, wherein by way of illustration, filters $X_1$ and $X_2$ have been excited in successive time intervals T. The selected waveforms are then applied to radio frequency power amplifier 14 whose output is radiated by antenna 15. The transmitted signal may be radiated at any desired transmission frequency by frequency conversion in amplifier 14 according to well-known techniques.

In Figure 1, at the receiver generally indicated at 20, the filters $Y_1, Y_2 \ldots Y_M$ are linear filters "matched" respectively to the corresponding filters $X_1, X_2 \ldots X_M$ at the transmitter. The filter $Y_k$ is considered to be matched to filter $X_k$ if the impulse response $y_k(t)$ of $Y_k$ is substantially equal to the impulse response $x_k(t)$ of $X_k$ with its time scale reversed. In mathematical form, neglecting an arbitrary delay:

$$y_k(t)=x_k(T-t)$$

Goldman, in his book, Information Theory, published by Prentice-Hall, Inc. in 1953, pointed out in chapter VIII, "Linear Correlation, Filtering and Prediction," that, if a signal $x_k(t)$ is applied to the filter $Y_k$ matched to the filter $X_k$ generating $x_k(t)$, the output signal from filter $Y_K$ will be equal, apart from a constant delay, to:

$$\theta_K(t)=\int_{-\infty}^{\infty}x_k(z)x_k(z-t)\,dz$$

which, in turn, is proportional to the autocorrelation function of $x_k(t)$.

Mathematically, it has also been established that, if the energy of $x_k(t)$ is reasonably well distributed over the frequency band W, the time function $\theta_K(t)$ has the appearance of a radio frequency pulse having a width or time duration $t_2$ approximately equal to $1/W$. This pulse is preceded and followed by signals whose amplitude can be made negligibly small compared to that of the pulse by using a sufficiently large value of the product TW.

Then if the filter $X_K$ at the transmitter is excited by a pulse of width $t_1$, appreciably smaller than $1/W$, the pulse output from $Y_K$ at the receiver will have a width $t_2$ approximately equal to $1/W$. If the other filters are properly selected relative to $X_K$ and $Y_K$, their outputs will consist of signals of amplitude approximately equal to that of the signals preceding and following the pulse in the output of $Y_K$. Thus, for instance, if filters $X_1$ and $X_2$ are excited in succession, as illustrated in Figure 2*b*, the output signals from filters $Y_1$, $Y_2$ and $Y_M$ at the receiver will have the general appearance as illustrated in Figure 2*c* for the time functions $Y_1$, $Y_2$ and $Y_M$ respectively.

Since in each interval of time T at least one pulse will be present in the output of one and only one of the filters at the receiver, namely, that corresponding to the filter excited at the transmiter, the receiver will be able to recognize the symbol of the input message that has just been transmitted.

At the receiver 20, signals picked up by antenna 21 are fed to R.F. amplifier 22 which has sufficient gain to provide signals of ample amplitude to overcome the attenuation inherent in subsequent stages. The output of amplifier 22 is fed simultaneously to filters $Y_1, Y_2 \ldots Y_M$. The function of identifying in each time interval T the filter having a sharply pulsed output is performed by detector and expander 23, averaging filter 24 and decoder 25.

Detector and expander 23 represents well-known conventional circuits for rectifying the signal output of the particular filter to which it is connected and performing a volume expansion of the resulting signal in order to increase the amplitude of the pulses relative to the remainder of the signal. The optimum non-linear law to be used in volume expansion depends on the nature and magnitude of the noise present with the signal. The technique of bottom clipping can be employed in most cases provided the clipping level is set higher than the signal level preceding and following the peaked pulse portion of the filter output signal.

Averaging filters 24 are conventional low pass filters whose function is to integrate the output signal from the detector and volume expander over a time interval equal to T. Thus the output of averaging filter 24 as shown in Figure 2*e* is roughly a measure of the total energy in the pulse output from each filter in each time interval T.

The presence of more than one propagation path, will not hamper the operation of the system as long as the relative delays between adjacent paths are larger than the width $t_2$ of the output pulses of the receiver's matched filters and the maximum delay between paths is smaller than the duration T of the impulse response of the filters. If the delay between two adjacent paths is less than $t_2$, the corresponding pulses in the output of the filter will interfere with each other, giving rise either to fading or reinforcement. If the largest delay is longer than T, harmful inter-symbol interference will result. In fact, the presence of three paths, for example, will result in the appearance of three successive pulses in the output of the appropriate filter, instead of just one, all within the same time interval T, as illustrated in Figure 2*d*. More precisely the output of the appropriate filter at receiver 20 will be approximately equal to the impulse response of the ionospheric propagation medium, band limited to the same frequency band as that of the impulse response of the filters.

Finally, decoder 25 represents a conventional device which functions to compare the output signals from the several averaging filters, selects the channel containing the largest output in each time interval T and records the corresponding symbol, thereby reconstructing the input message to the transmitter 10.

It is important to note that the operation of the present system does not depend on any synchronization between transmitter and receiver or on knowledge of the channel delay of the propagation medium or knowledge of the multipath condition at any time. The operation of the present invention depends only on the system components being constructed within suitable tolerances, particularly with respect to the matched filters.

Figure 3:
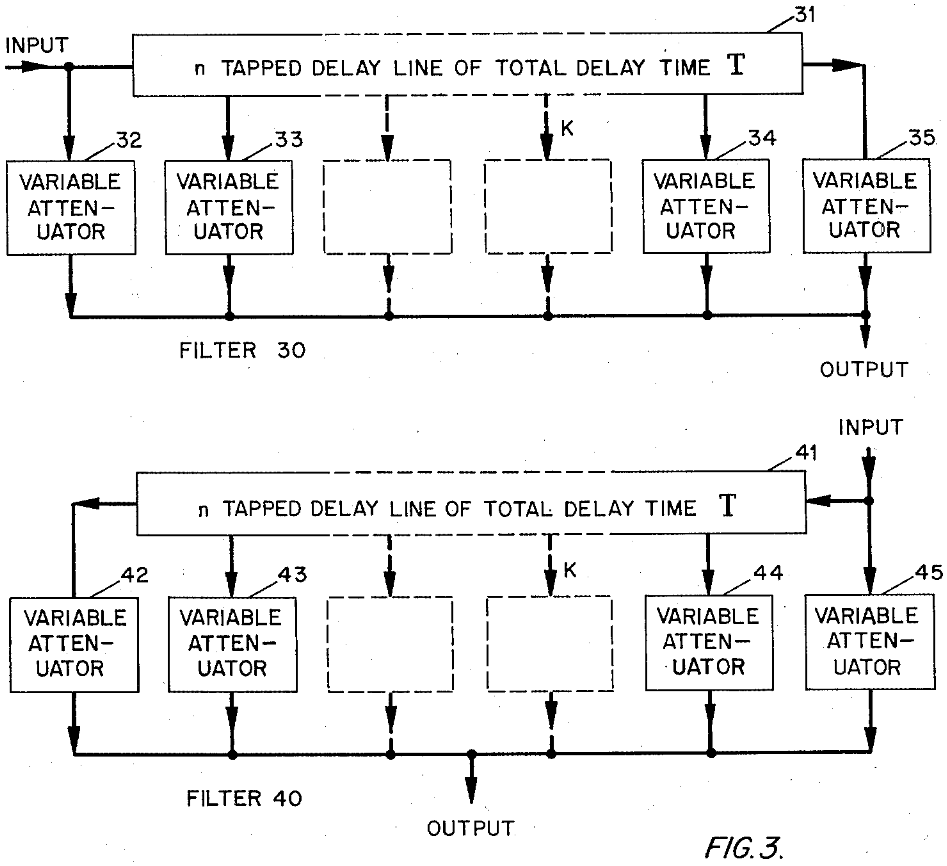
Figure 3 is a diagram in schematic block form of one method of obtaining the matched filters at the transmitter and receiver respectively.

Physically, the required sets of matched filters can be realized in a number of ways as discussed by Gabor in his paper, "Communication Theory and Cybernetics," Trans. I.R.E. Professional Group in Circuit Theory, volume CT–1, No. 4, December 1954, pp. 19–31. One of the simpler methods is illustrated in Figure 3 wherein delay line 31 and delay line 41 represent two identical tapped delay lines having a pass band somewhat larger than W and a total delay T. The several taps may be substantially equally spaced in delay intervals, although equal spacing is not required, and their number N should be equal to 2TW in order to maintain full freedom in selecting the impulse response. Attenuators 32, 33, 34 and 35 represent only four of the total number of attenuators which would be associated with an *n*-tapped delay line and are bipolar variable resistances which permit varying the amplitude and polarity of the signal output at each tap. The outputs from attenuators 32, 33, 34 . . . 35 are added to produce the output of filter 30. If a narrow pulse is fed to delay line 31 at the left, the output of the filter will consist of a sequence of pulses from the successive taps taken in order from left to right. If the attenuators 42, 43, 44 . . . 45 of delay line 41 are set identically to attenuators 32, 33, 34 . . . 35 of delay line 31 and if the input pulse is fed to delay line 41 at the right, the output of filter 40 will consist of the same pulses as those in the output of filter 30 but in reverse order. It follows that the two identical filters 30 and 40, when fed from opposite ends, form a pair of matched filters as defined above.

It is clear that the effect of attenuation in the delay lines can be balanced out by apparatus readjustment of attenuator settings.

The impulse response can be adjusted by means of the variable attenuators. However, it is seen that each delay line so connected and energized at either end constitutes a filter with an impulse response lasting for a time T equal to the total delay of the line. Other pairs of matched filters can be obtained from the same two delay lines by using separate sets of variable attenuators. The advantage of obtaining each bank of filters from a single delay line is an important feature of the illustrated construction.

The operation performed on the signal by a matched filter can be readily understood in terms of the delay line filters illustrated in Figure 3. Assuming for simplicity that all of the variable attenuators are set to either plus or minus one, let a narrow pulse be fed to filter 30 from the left and the output of filter 30 to be fed to filter 40 from the right. The input pulse will appear at the output of the $k$th tap of delay line 31 at some time $t_k$, and after being fed to delay line 41, it will appear at the output of the corresponding $k$th tap of delay line 41 at a time:

$$t=t_k+(T-t_k)=T$$

In other words, the total delay of any path passing through corresponding taps of the two delay lines is equal to T. It follows that N pulses of the same polarity and phase will appear simultaneously at the N attenuator outputs of delay line 41 exactly T seconds after the narrow pulse is fed to delay line 31. At all other times the pulses appearing simultaneously at the attenuator outputs of delay line 41 will have different phases and polarities so that the pulses can be made to tend to cancel each other. It follows then that output at time T will be considerably larger than the output at any other time.

Figure 4:
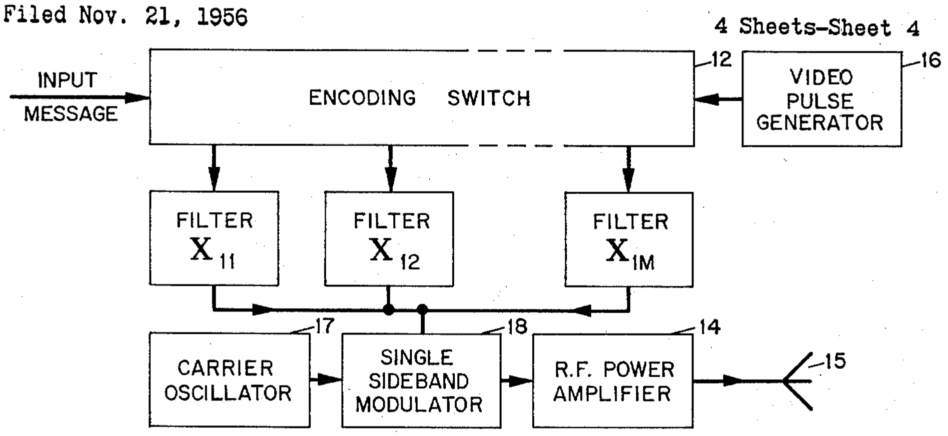
Figure 4 is a diagram in schematic block form of another embodiment of the invention.
Figure 4:
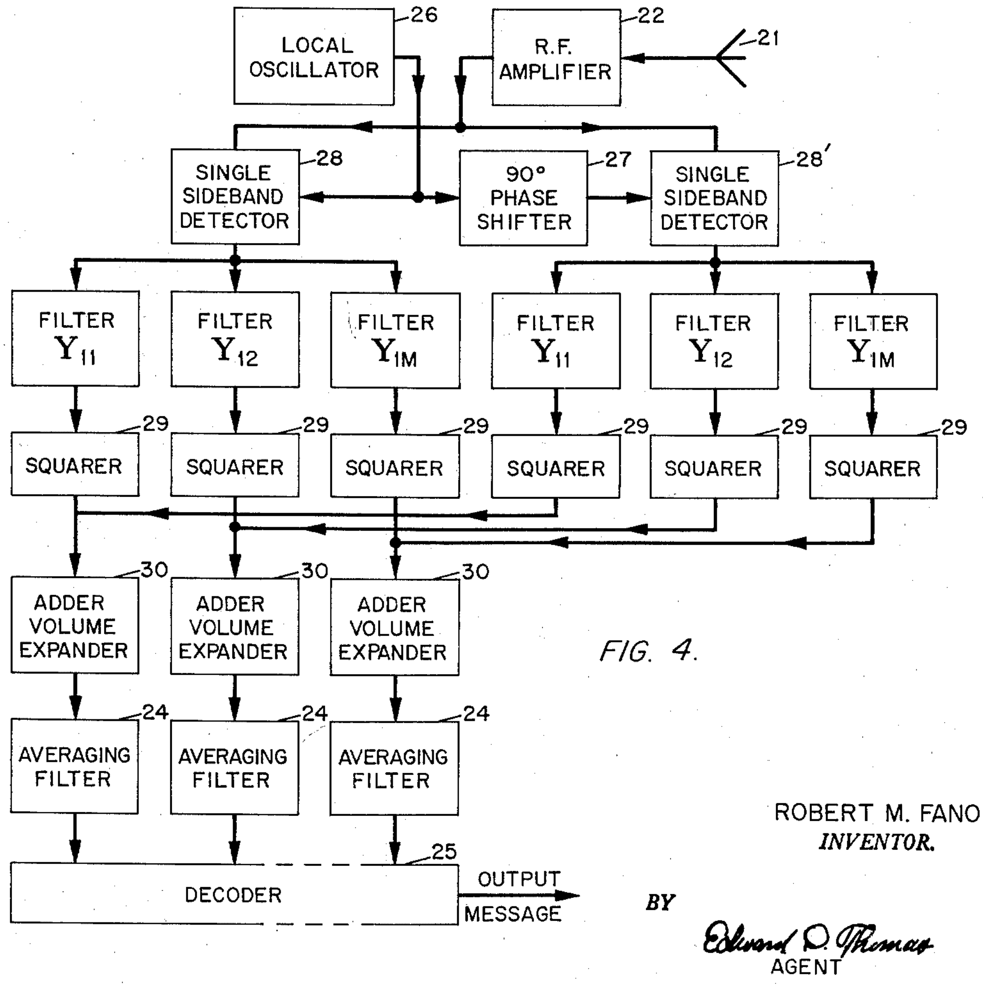

The two banks of matched filters, one at the transmitter and the second at the receiver, which form the heart of the system described above, can be built to operate at any convenient frequency through the use of conventional heterodyning techniques. They can also be implemented in the form of video filters. If this type of operation is performed, however, single-sideband modulation is required at the transmitter, and quadrature synchronous detection must be performed at the receiver in order to avoid the detection loss inherent to rectification. With reference to Figure 4, a video pulse generator 16 feeds encoding switch 12 which in turn applies each of the video pulses to one and only one of the video filters $X_{11}$, $X_{12}$ . . . $X_{M_1}$ according to the successive symbols of the input message. The output of carrier oscillator 17 and the output of the video filters are fed to a conventional single-sideband modulator 18, the output of which is applied to antenna 15 through amplifier 14.

At the receiver two banks of video filters $Y_{11}$, $Y_{12}$ . . . $Y_{M_1}$ are matched, as described above, to corresponding video filters $X_{11}$, $X_{12}$ . . . $X_{M_1}$ at the transmitter. Local oscillator 26 operates at the same freqency as carrier oscillator 17 of the transmitter. The signal picked up by antenna 21 is fed after amplification by R.F. amplifier 22 to two channels represented by single sideband detectors 28 and 28' respectively. The output of local oscillator 26 is fed directly to detector 28 and through 90° phase shifter 27 to detector 28'. The video outputs of detectors 28 and 28' are fed to the two banks of matched video filters. The output of each filter is squared in squarers 29. The squared outputs from corresponding filters are then added in adders 30. The added signals are then fed to averaging filters 25 before application to decoder 25. If desired, volume expansion circuits or bottom clipping can be incorporated in the circuits of adders 30.

Figure 5:
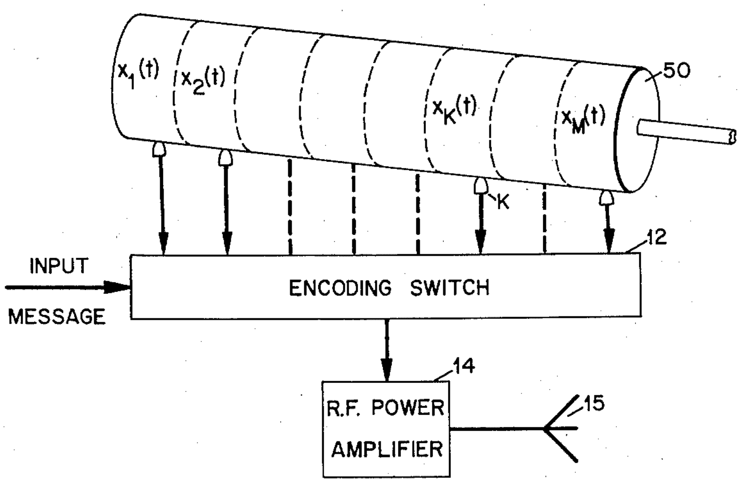
Figure 5 illustrates an alternate method of generating the appropriate set of waveforms at the transmitter.

The generation of signal waveforms $x_1(t)$, $x_2(t)$ . . . $x_M(t)$ at the transmitter need not be performed by means of linear filters. It is essential, however, that these signals be detected at the receiver by means of filters with impulse responses matched to the transmitted waveforms as discussed above. Figure 5 illustrates a transmitter for a communication system according to the present invention which requires only one set of filters.

In order to obtain the signal waveforms $x_1(t)$, $x_2(t)$ . . . $x_M(t)$ the receiver filters, $Y_1$ $Y_2$ . . . $Y_M$ of Figure 1, are excited in the same manner that the transmitter filters are excited in Figure 1. The separate responses of the receiver filters are recorded on some suitable recording medium such as photographic film, magnetic tape or on a magnetic drum 50 in Figure 5. For each of the receiver filters used in the system there is a separate track on drum 50, a total of M tracks for an M filter system. Thus the $k$th track on drum 50 carries the impulse response $y_k(t)$. Now, if the direction of rotation of drum 50 is reversed, but with its speed accurately maintained equal to the speed of recording, the signal picked off by reading head $k$ at the $k$th track will be $x_k(t)=y_k(T-t)$ apart from a constant delay. This relationship is seen to be equivalent to that derived above for impulse responses of matched filters.

As before, each symbol of the input message to encoder 12 is transmitted as the waveform of a particular selected track on drum 50. The receiver for use with the transmitter of Figure 5 is identical to the receiver of Figure 1.

Having thus described the invention, what is claimed is:

1. In a wide band communication system wherein the propagation characertistics produce a plurality of signals having different times of arrival at a remote receiver, the elapsed time between the first and last of said signals being equal to D, apparatus for transmitting coded information comprising, means for generating a plurality of distinctive asymmetrical waveforms, one for each symbol of said code, each of said waveforms having a duration time T greater than D and a bandwidth W greater than the reciprocal of the minimum time delay between adjacent signals, means for radiating said waveforms in proper sequence corresponding to the symbols of said coded information, a receiver for said radiated waveforms, a parallel bank of filters, each of said filters being matched to a separate one of said waveforms and providing a sharply peaked output only in response thereto, means for applying said received waveforms to said bank of filters, a bank of non-linear circuits, each responsive to a separate one of said filters for rectifying and volume expanding each filter output, means averaging the resultant signals over a time interval equal to T to obtain an integrated response to said plurality of signals having different times of arrival, and means for detecting the sequence of averaged filter responses to recover the sequence of code symbols in the transmitted information.

2. Apparatus as defined in claim 1 wherein said filters each consists of a delay line having a pass band W and a total delay time T and tapped at N spaced intervals, and a set of N variable attenuators having a common output terminal, each tap of said delay line being connected to a separate one of said attenuators whereby adjustment of said attenuators controls the waveform of the impulse response of said filter.

3. In a wide band communication system wherein the propagation characteristics produce a plurality of signals having different times of arrival, the elapsed time between the first and last of said signals being equal to D, apparatus for transmitting coded messages comprising, a parallel bank of different linear filters having one filter for each symbol of said code, all of said filters having impulse responses lasting for a time T and occupying a frequency band W greater than the reciprocal of the minimum time delay between adjacent signals, a source of radio frequency pulses having a time duration $t_1$ less than $1/W$ and a pulse repetition interval T greater than D, means for encoding said message as a continuous succession of said waveforms selected from said bank of filters by applying pulses from said source to energize selected filters in proper sequence according to the symbols of said code, means for amplifying and radiating said sequence of waveforms, a receiver for said radiated waveforms, a second bank of filters having one filter for each of said symbols, means for adjusting each of said filters to have a sharply peaked output of time duration $t_2=1/W$ only in response to the waveform representing the code symbol selected for said filter, means for applying said received waveforms to said second bank of filters in parallel, rectifying and volume expanding each filter output, averaging the resultant signals over a time interval T to obtain an integrated response to all of said plurality of signals having different arrival times, and means for detecting the sequence of averaged filter responses over successive periods of time T to recover the sequence of code symbols in the transmitted sequence of waveforms.

4. Apparatus as defined in claim 3 wherein said first and second banks of filters each consists of a delay line having a pass band W and a total delay time T and tapped at a plurality of spaced intervals and a plurality of sets of variable attenuators, one set of attenuators being provided for each symbol of said code, each tap of said delay line being connected to a separate attenuator in each set of attenuators, and a common output terminal for the attenuators comprising each set, whereby the adjustment of the attenuators in each set controls the impulse response at the output terminal thereof.

5. Apparatus as defined in claim 3 wherein said first and second banks of filters each consists of a delay line having a pass band W and a total delay time T tapped at N spaced intervals, where $N=2TW$, and a separate set of N variable attenuators having a common output terminal for each symbol of said code, each tap of said delay line being connected to a separate attenuator in each set, whereby adjustment of the attenuators in each set of said first bank controls the impulse response at the output terminal thereof to provide a distinctive waveform corresponding to each symbol of said code and adjustment of the attenuators in each set of said second bank provides a sharply peaked output at the output terminal thereof only in response to a single selected distinctive waveform thereby to secure two banks of matched filters.

6. A communication system for transmitting coded information through a propagation channel in a medium having multipath effects causing distortion in waveform of a transmitted signal at a receiver comprising, a pulse generator, a first linear filter having an asymmetrical wide band impulse response $x(t)$ of time duration T greater than the maximum multipath delay of said channel and a bandwidth W greater than the reciprocal of the minimum time delay in said channel between adjacent signal paths, means for generating a signal waveform by applying the output of said pulse generator to said first filter, means for transmitting said signal waveform through said medium, a second filter having an asymmetrical wide band impulse response $y(t)$ matched to said first filter by the relationship $y(t)=x(T-t)$, a receiver for said transmitted signal waveform, means for applying said received waveform to said second filter, and means responsive to the output of said second filter to detect the occurrence of said signal waveform by the sharply peaked response of said second filter thereto.

7. A communication system for transmitting coded information through a multipath propagation channel comprising means for generating a plurality of distinctive asymmetrical waveforms each representing a different symbol of said code, all of said waveforms having the same time duration T greater than the maximum multipath delay of said channel and the same bandwidth W greater than the reciprocal of the minimum time delay in said channel between adjacent signal paths, a transmitter for sending said waveforms through said channel in a sequence determined by said coded information, a receiver responsive to said waveforms, a plurality of filters, each filter being matched to a different one of said waveforms by having an impulse response substantially equal to said waveform with its time scale reversed whereby the response of said filter to its matched waveform is a pulse having a time duration substantially equal to $1/W$, means for applying the output of said receiver to said plurality of filters, and means for detecting in each time interval T which of said plurality of filters has a pulse output to recover said transmittal sequence of symbols.

8. In a communication system using a distinctive asymmetrical waveform to represent each symbol of a message code, the combination of apparatus comprising, a pulse generator, a first linear filter for each symbol of said code, said first filter having an asymmetrical wide band impulse response $x(t)$ of time duration T, means for generating a signal waveform by applying the output of said pulse generator to said first filter, means for transmitting said signal waveform, a second linear filter having an asymmetrical wide band impulse response $y(t)$ and matched to said first filter in the relationship $$y(t)=x(T-t)$$

a receiver for said transmitted signal waveform, means for applying the output of said receiver to said second filter, and means responsive to the output of said second filter to detect the presence of said signal waveform by the sharply peaked response of said second filter thereto.

9. In a communications system using a distinctive asymmetrical waveform to represent each symbol of a message code, the combination of apparatus comprising, a pulse generator, a first bank of filters having a separate linear filter for each symbol of said code, each filter of said first bank having an asymmetrical wide band impulse response $x(t)$ of time duration T, means for generating a sequence of signal waveforms by applying the output of said pulse generator to selected filters of said first bank, means for transmitting said sequence of signal waveforms, a second bank of filters having a separate linear filter having an asymmetrical wide band impulse response $y(t)$ and matched to one of said first bank of filters in the relationship $y(t)=x(T-t)$, a receiver for said transmitted signal waveforms means for applying the output of said receiver to said second bank of filters, and means responsive to the output of said second bank of filters to detect the sequence of said signal waveforms by the sharply peaked responses of said second bank of filters thereto.

10. In a communications system utilizing distinctive asymmetrical waveforms to represent each different symbol in an uncoded message, the combination of apparatus comprising, a first bank of different linear filters, each of said filters having a distinctive asymmetrical wide band impulse response and representing a separate one of said symbols, all of said filters having impulse responses of the same time duration and frequency band width, means for recording the impulse responses of said filters, means for reproducing said responses in a time reversed waveform, means for selecting said time reversed waveforms, in an appropriate sequence to convey the information contained in the symbols of said uncoded message, means for transmitting said sequence of waveforms, a remote receiver responsive to said transmitted sequence of waveforms, a second bank of filters connected in parallel, each of said filters in said second bank having characteristics identical to a separate one of said filters in said first bank whereby said second bank of filters is identical in characteristics to said first bank of filters, means for applying said receiver output to said second bank of filters, and means for detecting the sequence of filter outputs to recover the sequence message symbols.

11. In a communications system utilizing distinctive asymmetrical waveforms to represent each different symbol in an uncoded message, the combination of apparatus comprising, a first bank of different linear filters, each of said filters having a distinctive asymmetrical wide band impulse response and representing a separate one of said symbols, all of said filters having impulse responses of the same time duration and frequency band width, a pulse generator, means applying the output of said pulse generator to said bank of filters, means for recording the impulse responses of said filters, means for reproducing said responses in a time reversed waveform, means for selecting said time reversed waveforms in an appropriate sequence to convey the information contained in the symbols of said uncoded message, means for transmitting said sequence of waveforms, a remote receiver responsive to said transmitted sequence of waveforms, a second bank of filters connected in parallel, each of said filters in said second bank having characteristics identical to a separate one of said filters in said first bank whereby said second bank of filters is identical in characteristics to said first bank of filters, means for applying said receiver output to said second bank of filters, and means for detecting the sequence of filter outputs to recover the sequence message symbols.

References Cited in the file of this patent

UNITED STATES PATENTS 2,198,248 Hansell ---------------- Apr. 23, 1940
2,401,618 Crosby ----------------- June 4, 1946
2,676,203 Phelps ----------------- Apr. 20, 1954
2,839,727 Lozier ----------------- June 17, 1958

FOREIGN PATENTS 658,479 Great Britain ----------- Oct. 10, 1951